US010083720B2

(12) United States Patent
Zhou et al.

(10) Patent No.: US 10,083,720 B2
(45) Date of Patent: Sep. 25, 2018

(54) METHOD AND SYSTEM FOR VIDEO DATA STREAM STORAGE

(71) Applicant: Aupera Technologies, Inc., Burnaby (CA)

(72) Inventors: Zhengning Zhou, Shenzhen (CN); Yu Feng Liao, Surrey (CA)

(73) Assignee: Aupera Technologies, Inc. (CA)

(*) Notice: Subject to any disclaimer, the term of this patent is extended or adjusted under 35 U.S.C. 154(b) by 0 days.

(21) Appl. No.: 15/093,566

(22) Filed: Apr. 7, 2016

(65) Prior Publication Data

US 2017/0133059 A1 May 11, 2017

Related U.S. Application Data

(60) Provisional application No. 62/252,021, filed on Nov. 6, 2015.

(51) Int. Cl.
*H04N 5/77* (2006.01)
*G11B 27/10* (2006.01)
*H04N 5/91* (2006.01)

(52) U.S. Cl.
CPC ............. *G11B 27/10* (2013.01); *H04N 5/91* (2013.01)

(58) Field of Classification Search
USPC .......................................... 386/223–225, 241
See application file for complete search history.

(56) References Cited

U.S. PATENT DOCUMENTS

| 7,633,799 | B2 | 12/2009 | Gorobets | |
|---|---|---|---|---|
| 8,510,500 | B2 | 8/2013 | Moon | |
| 8,533,550 | B2 | 9/2013 | Khan | |
| 8,745,319 | B2 | 6/2014 | Langlois | |
| 2002/0118875 | A1* | 8/2002 | Wilensky | G06T 7/0083 382/173 |
| 2005/0259688 | A1* | 11/2005 | Gordon | H04N 21/4382 370/477 |
| 2010/0013931 | A1* | 1/2010 | Golan | G06K 9/00771 348/150 |
| 2010/0013999 | A1* | 1/2010 | Momosaki | H04N 19/40 348/581 |
| 2010/0026842 | A1* | 2/2010 | Ishizaka | G06F 17/30781 348/231.2 |
| 2010/0074590 | A1* | 3/2010 | Momosaki | G11B 27/034 386/278 |
| 2011/0157411 | A1* | 6/2011 | Hata | H04N 9/045 348/223.1 |
| 2011/0170769 | A1* | 7/2011 | Sakimura | G06K 9/623 382/159 |
| 2012/0054818 | A1* | 3/2012 | Noh | H04N 21/222 725/143 |

(Continued)

*Primary Examiner* — Nigar Chowdhury
(74) *Attorney, Agent, or Firm* — Timothy T. Wang; Ni, Wang & Massand, PLLC

(57) ABSTRACT

Video data stream storage comprising: receiving, by at least one processor, at least one raw video stream that has at least one object, recording, in at least one memory the at least one raw video stream, extracting, by the at least one processor, at least one object characteristic of the at least one object and at least one timestamp associated with the at least one object characteristic and recording, in the at least one memory the at least one object characteristic and the at least one timestamp associated with the at least one object characteristic.

14 Claims, 8 Drawing Sheets

(56) References Cited

U.S. PATENT DOCUMENTS

| | | | |
|---|---|---|---|
| 2012/0098864 A1* | 4/2012 | Chowdhry | G09G 5/14 345/660 |
| 2012/0109997 A1* | 5/2012 | Sparks | G06F 17/30029 707/769 |
| 2012/0124177 A1* | 5/2012 | Sparks | G06Q 20/123 709/219 |
| 2012/0170903 A1* | 7/2012 | Shirron | H04N 5/783 386/230 |
| 2012/0314917 A1* | 12/2012 | Kiyohara | G06F 17/30029 382/118 |
| 2013/0080687 A1 | 3/2013 | Nemazie | |
| 2013/0235224 A1* | 9/2013 | Park | H04N 5/23222 348/218.1 |
| 2013/0318604 A1* | 11/2013 | Coates | H04L 63/1416 726/22 |
| 2014/0016696 A1* | 1/2014 | Nelson | H04N 19/105 375/240.12 |
| 2014/0105466 A1* | 4/2014 | Botes | G06K 9/00221 382/118 |
| 2014/0283125 A1* | 9/2014 | Stanley | G06F 21/62 726/28 |
| 2015/0104149 A1* | 4/2015 | Sim | G11B 27/031 386/241 |
| 2015/0163448 A1* | 6/2015 | Khandpur | G06K 9/00221 348/77 |
| 2015/0261460 A1 | 9/2015 | Liao | |
| 2016/0005435 A1* | 1/2016 | Campbell | H04N 9/806 386/240 |
| 2016/0118080 A1* | 4/2016 | Chen | G11B 27/28 386/344 |
| 2016/0224837 A1* | 8/2016 | Lipert | G06K 9/00288 |
| 2017/0000392 A1* | 1/2017 | Smith | A61B 5/14551 |
| 2017/0220853 A1* | 8/2017 | Golan | G06K 9/00295 382/118 |

* cited by examiner

METHOD AND SYSTEM FOR VIDEO DATA STREAM STORAGE

BACKGROUND

Disclosed embodiments relate to computer storage systems, and more particularly, to a system and method for unifying video data storage and video data analytics.

Video data storage is in demand for enterprises, public security and the like. Currently, data storage solutions are designed for generic purposes, and video analytics is a time consuming and computational resource intensive process. Additionally, data shuttling between storage and analytics processing entity consumes excessive bandwidth and storage resources.

By employing background subtraction in moving object detection, a search space and detecting area of interest may be significantly reduced, which enables more efficient data transfer and analysis.

SUMMARY

In one embodiment, a method of video data stream storage comprises at least one of: receiving, by at least one processor, at least one raw video stream that has at least one object, recording, in at least one memory the at least one raw video stream, extracting, by the at least one processor, at least one object characteristic of the at least one object and at least one timestamp associated with the at least one object characteristic and recording, in the at least one memory the at least one object characteristic and the at least one timestamp associated with the at least one object characteristic In another embodiment, an apparatus comprises at least one processor, wherein the at least one processor performs at least one of: receives, by at least one processor, at least one raw video stream that has at least one object, subtracts, by the at least one processor, at least one background of the at least one raw video stream, records, by at least one memory, at least one subtracted background video stream, extracts, by the at least one processor, at least one object characteristic of the at least one object and at least one timestamp associated with the at least one object characteristic and records, in the at least one memory the at least one object characteristic and the at least one timestamp associated with the at least one object characteristic.

In a further embodiment, a non-transitory computer readable medium comprises instructions that when read by a processor performs at least one of: receiving, by at least one processor, at least one raw video stream that has at least one object, subtracting, by the at least one processor, at least one background of the at least one raw video stream, recording, by at least one memory, at least one subtracted background video stream, extracting, by the at least one processor, at least one object characteristic of the at least one object and at least one timestamp associated with the at least one object characteristic and recording, in the at least one memory the at least one object characteristic and the at least one timestamp associated with the at least one object characteristic.

DETAILED DESCRIPTION

Figure 1:
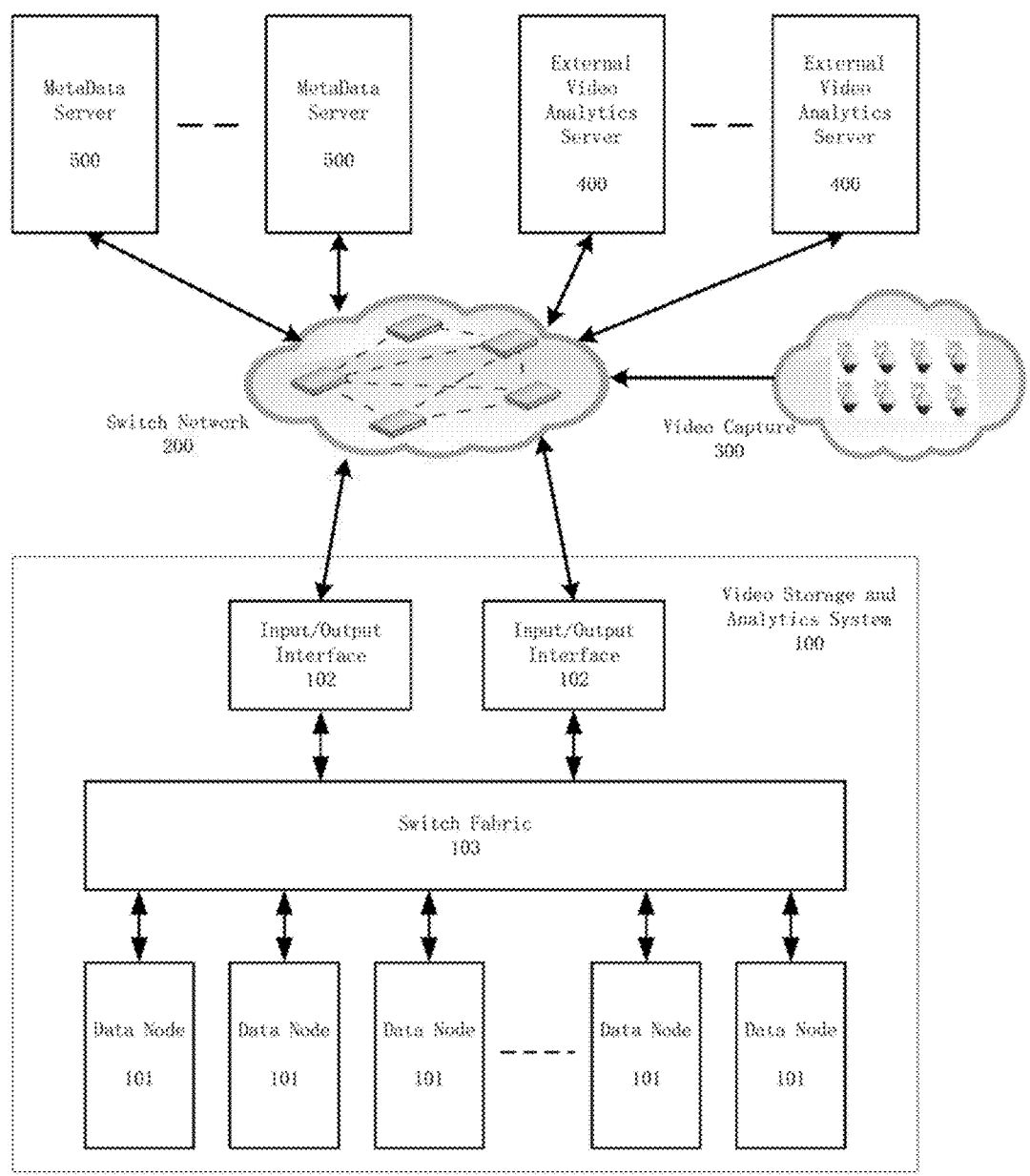
FIG. 1 shows a block diagram of an exemplary video storage and analytics system.

The disclosed system merges video data storage and video data analytics. It comprises a plurality of micro nodes. The node executes data storage application, and data analytics application. It comprises at least one processor, and at least one storage devices. The nodes are connected through switch fabric.

Analytics are available in near real time. In one scenario, during the video data stream capturing, distributed processing engine extract moving objects, tag them with extended metadata, which enables rapid content search. In another scenario, during recorded video data stream content search, distributed processing engine proceeds moving object detection, area of object will extracted and therefore smaller image blocks will be transferred to external video analytics server for further processing in much lower data rate.

The instant disclosure provides a distributed computing and storage system, with close coupled computing and storage element such architecture can provide more effective data store and processing for video stream.

While the disclosure is susceptible to various modifications and alternative forms, specific embodiments are shown by way of examples in the drawings and will be described in detail. It is to be understood, that the figures and detailed description discussed herein are not intended to limit the disclosure to particular form disclosed, but on the contrary, the intention is to cover all modifications, equivalents and alternatives falling within the spirit and scope of the present disclosure as defined by the appended claims.

In FIG. 1, multiple video data streams may be generated from multiple IP cameras (300) through switch network (200), are stored in the video storage and analytics system (100), external video analytics server (400) is used for post processing to gather more in-depth sights. In this example, three video analytics servers are illustrated, although the number of servers is not critical and is subject to change.

In FIG. 1, video storage and analytics system (100), may be a chassis, or a container box. Two Input/Output Interface module (102) are connected with switch fabric. In this example, two Input/Output Interface modules are illustrated, although the number of Input/Output Interface modules is not critical and is subject to change. In this example, Input/Output Interface module could be an Ethernet PHY or PHY and MAC device.

In FIG. 1, a switch fabric (103) is used to connect the nodes, and Input/Output Interface modules. There are different types of switch fabric, includes but not limited to: Ethernet switch, PCI-express switch, Serial Rapid IO switch.

Figure 2:
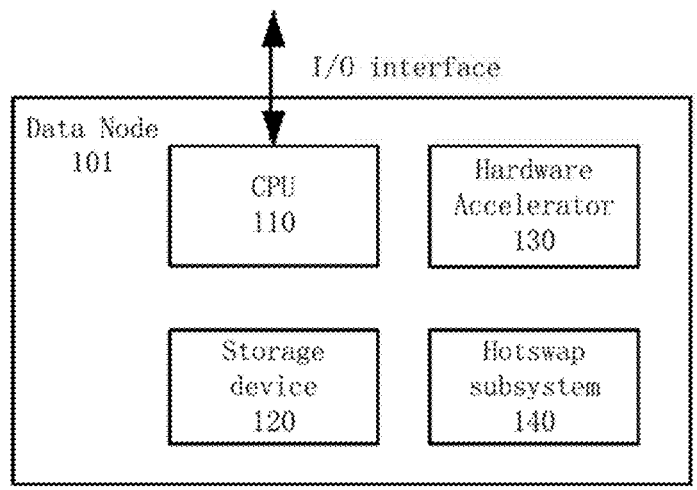
FIG. 2 shows a block diagram of an exemplary data node 101

In FIG. 2, the raw video data streams are transmitted to CPU (110), and then stored into the storage devices (120). The storage devices include but not limited to NAND Flash, eMMC, and/or other types of NVRAM, DDR SDRAM. The CPU (110) could be a general processor, examples of a suitable general processor, include Intel X86 family, ARM processor family, other suitable general processor will be apparent to those skilled in the art. Alternatively, a System on Chip (SoC) or a special purpose ASIC, or FPGA may be used to support functions as processor.

In FIG. 2, the CPU can be used for processing the raw video data stream, include but not limited to noise reduction, image scaling, color space conversion and gamma correction. Through object detection, background subtraction, feature extraction and image segmentation, area of object will be selected.

In FIG. 2, the CPU can also be used for examining the input raw video stream, tagging them with extended metadata.

In FIG. 2, the data node (101) can be hot-swap-able, hot-swap subsystem (140) includes but not limited to hotswap handle, hotswap electric circuits, and hotswap controller.

In FIG. 2, the hardware accelerator (130) can be a special purpose ASIC, or a FPGA, or a SoC, or Digital Signal Processor (DSP). It provides co-processing capabilities to CPU, for algorithm calculation includes but not limited to noise reduction, image scaling, color space conversion, gamma correction, motion detection, face recognition, pattern recognition.

Figure 3:
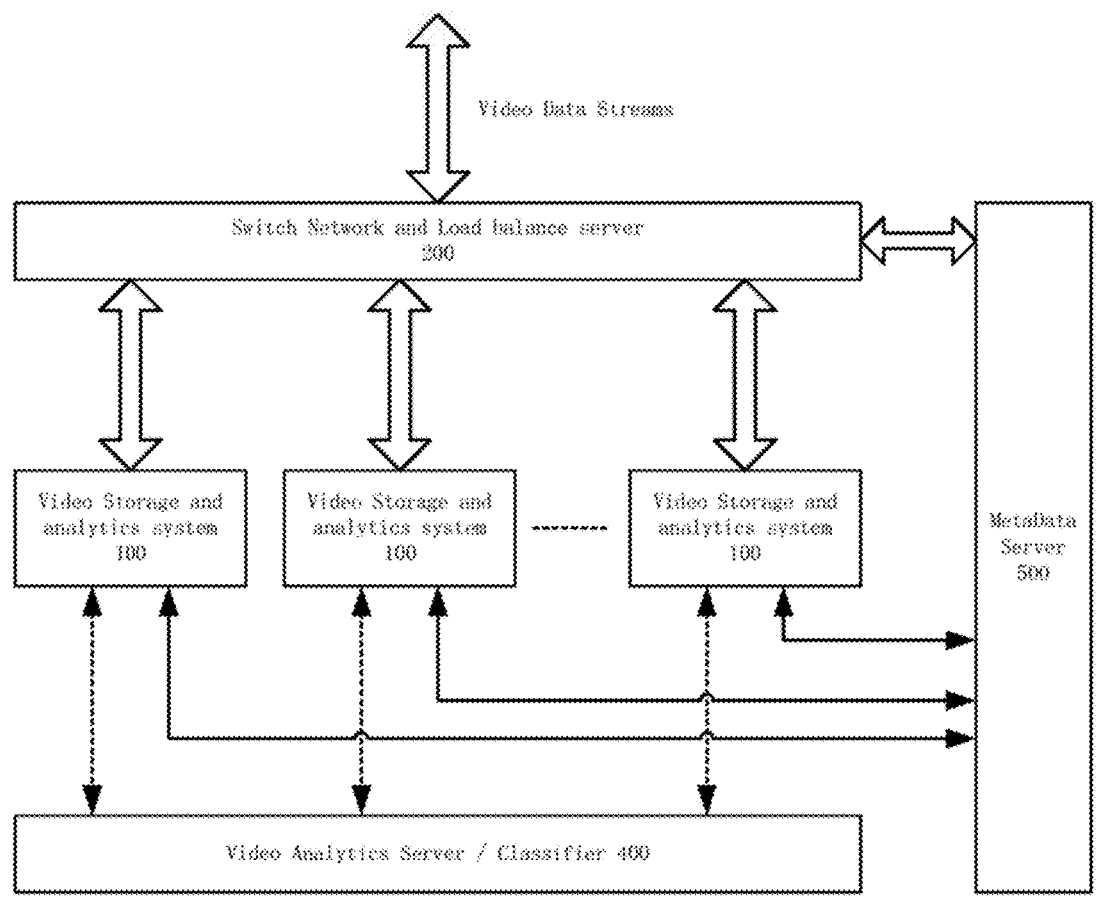
FIG. 3 shows a block diagram of an exemplary scale out video storage and analytics system.

In FIG. 3, an exemplary block diagram shows a scale out video data stream storage and analytics system. Video data streams are transmitted to a switch network and load balance server (200), through communicate with metadata server (500), a target data node will be determined, the raw data stream will be transmitted to the target node.

In FIG. 3, for example, according to customer selection, data node (101) will decide where to proceed the processing, either locally, with CPU (110) and hardware accelerator (130), or remotely, with video analytics server/classifier (400) to do further in-sight processing, including but not limited to face recognition, character extraction, pedestrian detection, vehicle or license plate recognition, gesture recognition.

In FIG. 3, for example, data nodes transmit time stamp, area of object, and advanced feature which may include but is not limited to hash value, related lossy and/or lossless mathematic encoding, to metadata server (500).

In FIG. 3, show an example video stream request, based on information in the metadata server, indexed by object address, time stamp, and advanced feature, system can rapidly locate the data node and its address.

Figure 4:
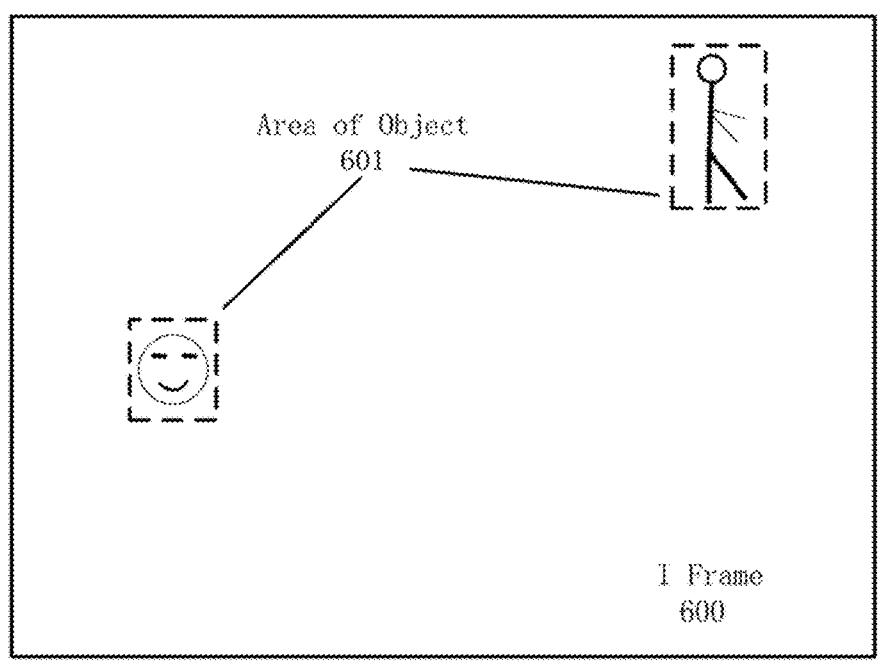
FIG. 4 shows an exemplary raw video data frame.

In FIG. 4, for example, in video surveillance application, interested objects include but not limited to face detection, or pedestrian detection. The area of the object is smaller than the original frame size.

Figure 5:
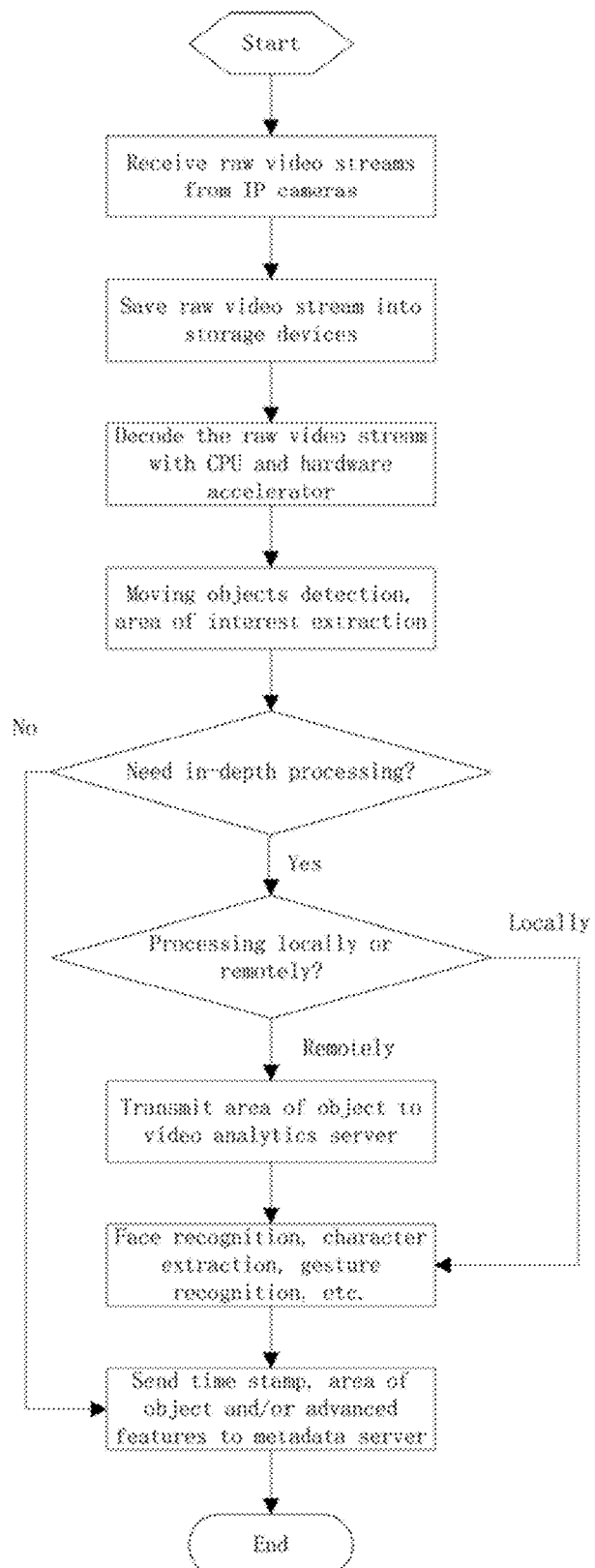
FIG. 5 shows a flow chart of an exemplary video stream processing during raw video capture and storing procedure.

In FIG. 5, for example, a flow chart shows the procedure when the processor in the node receives the input raw video stream.

Figure 6:
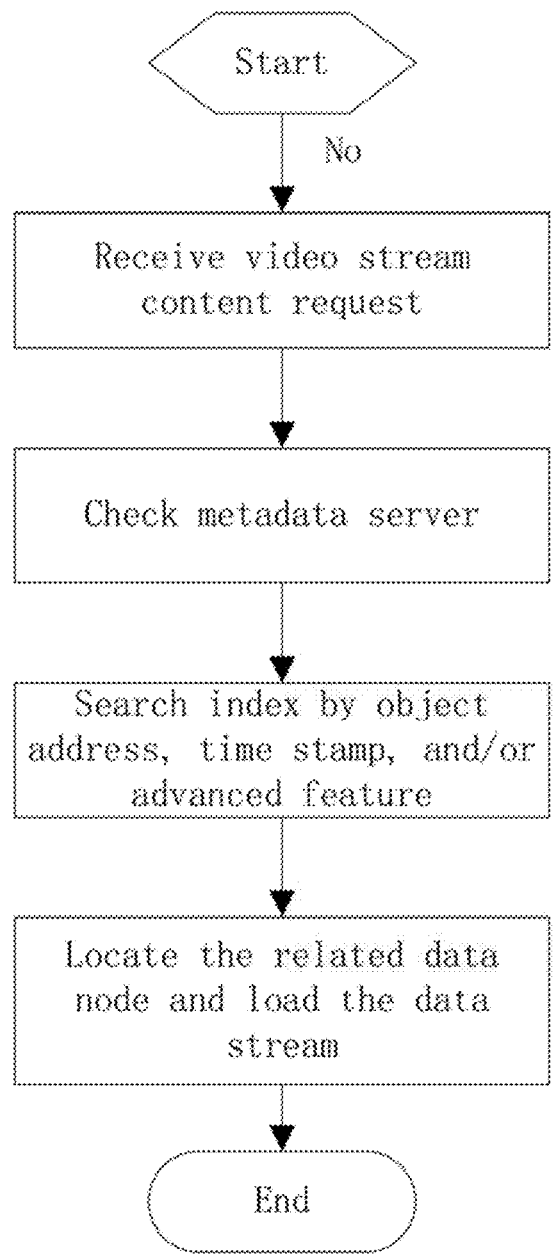
FIG. 6 shows a flow chart of an exemplary video content search for recorded video stream.

In FIG. 6, for example, a flow chart shows the procedure searching content in the recorded video stream.

Figure 7:
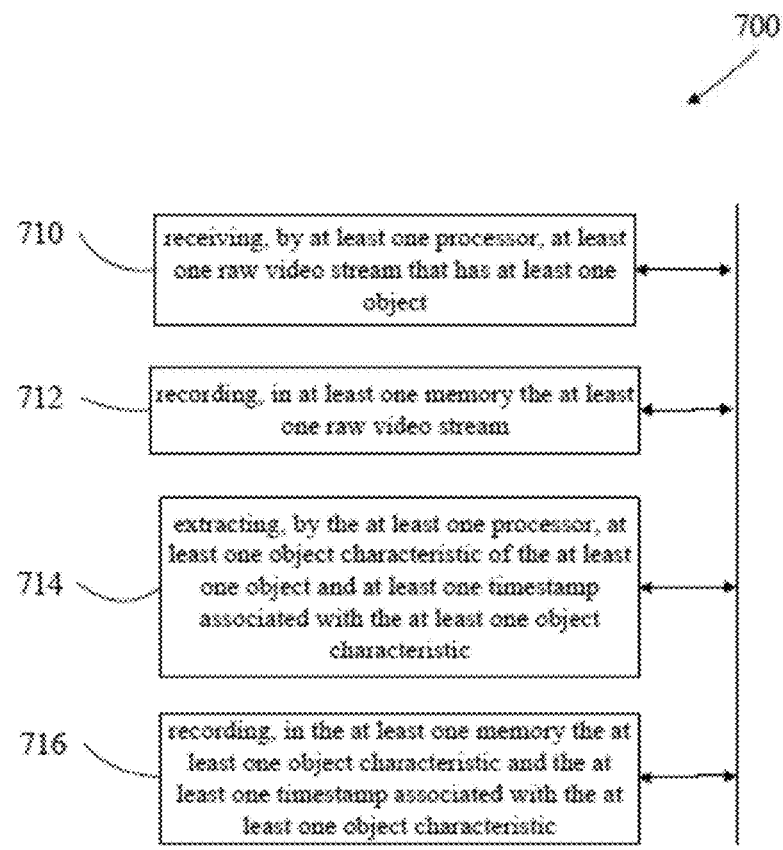
FIG. 7 depicts an example method in accordance with one embodiment of the disclosure.

In FIG. 7, an example method comprises, receiving (710), by at least one processor, at least one raw video stream that has at least one object, recording (712), in at least one memory the at least one raw video stream, extracting (714), by the at least one processor, at least one object characteristic of the at least one object and at least one timestamp associated with the at least one object characteristic and recording (716), in the at least one memory the at least one object characteristic and the at least one timestamp associated with the at least one object characteristic.

The method may additionally comprise decoding the at least one raw video stream, subtracting, by the at least one processor, at least one background of the at least one raw video stream and, recording, by the at least one memory, at least one subtracted background video stream, transmitting an area of the at least one object and indexing the at least one object characteristic and the at least one timestamp associated with the at least one object characteristic. The at least one object characteristic may comprise at least one of a movement, a facial recognition, a character recognition, a gesture recognition, a pedestrian detection, a vehicle recognition and a license plate recognition.

Figure 8:
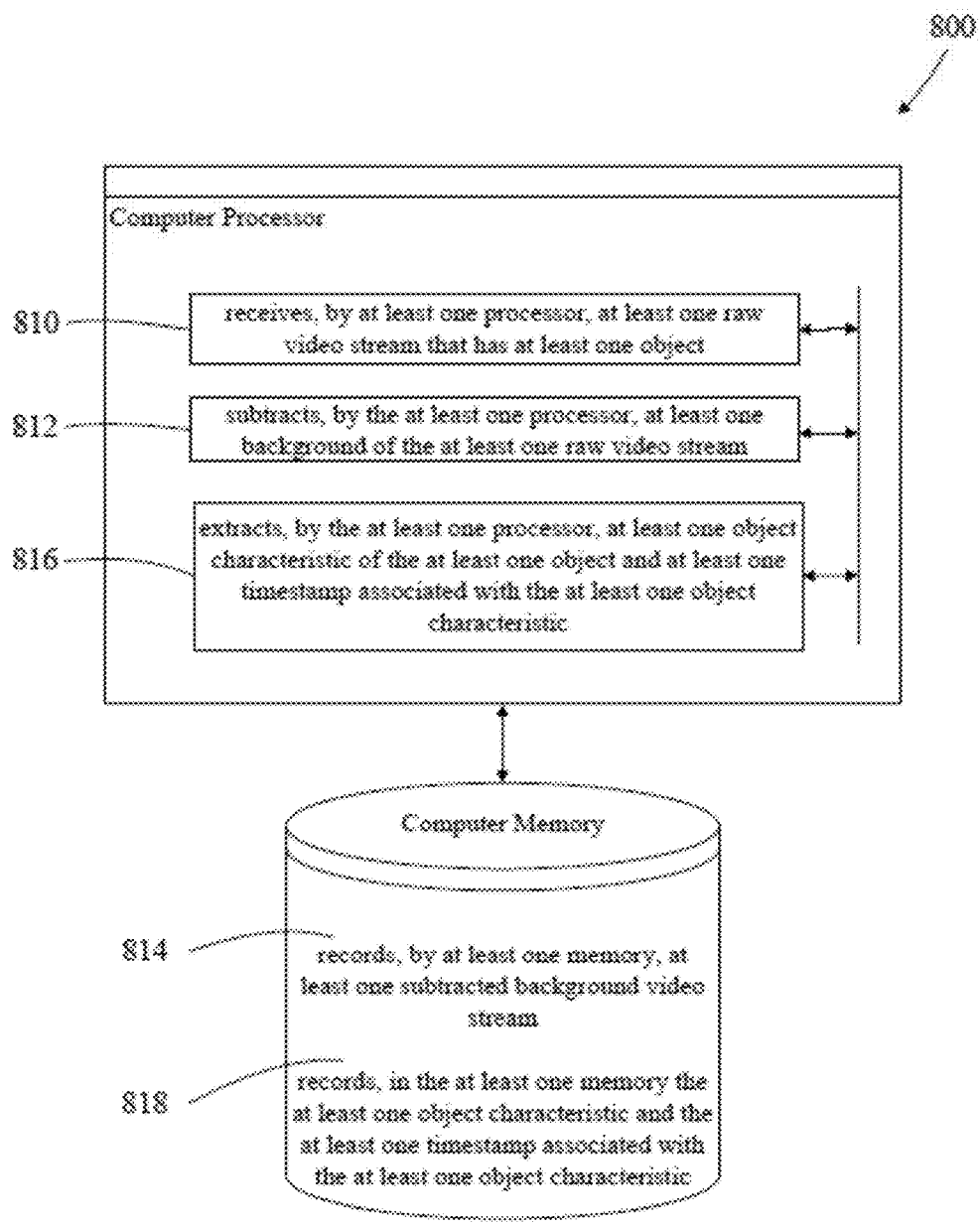
FIG. 8 depicts an example apparatus in accordance with one embodiment of the disclosure.

FIG. 8 depicts an example apparatus that comprises at least one processor that, receives (810), by at least one processor, at least one raw video stream that has at least one object, subtracts (812), by the at least one processor, at least one background of the at least one raw video stream, records (814), by at least one memory, at least one subtracted background video stream, extracts (816), by the at least one processor, at least one object characteristic of the at least one object and at least one timestamp associated with the at least one object characteristic and records (818), in the at least one memory the at least one object characteristic and the at least one timestamp associated with the at least one object characteristic.

The apparatus may further decode, by the at least one processor, the at least one raw video stream, subtract, by the at least one processor, at least one background of the at least one raw video stream and record, in the at least one memory the at least one subtracted background video stream, transmit an area of the at least one object and index the at least one object characteristic and the at least one timestamp associated with the at least one object characteristic.

The at least one object characteristic may comprise at least one of a movement, a facial recognition a character recognition, a gesture recognition, a pedestrian detection, a vehicle recognition and a license plate recognition.

Figure 9:
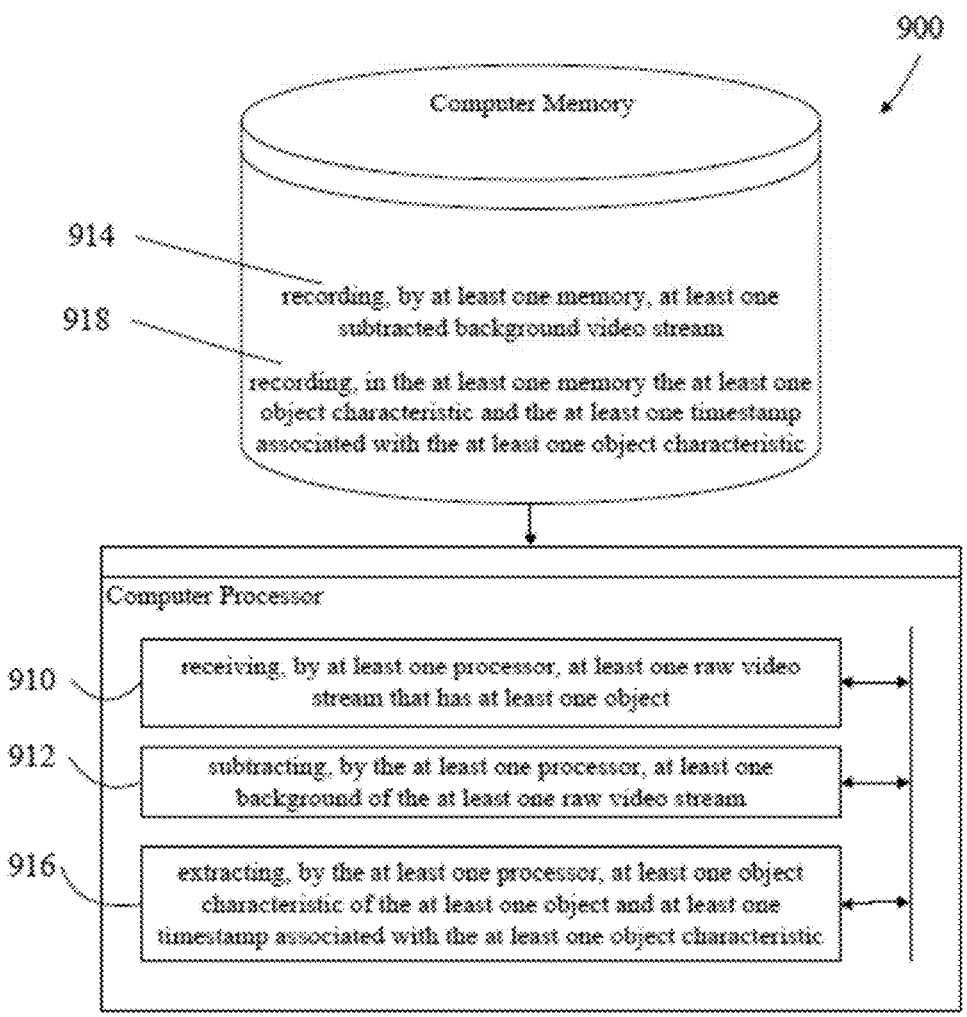
FIG. 9 depicts an example non-transitory computer readable medium in accordance with one embodiment of the disclosure.

FIG. 9 depicts an example non-transitory computer readable medium comprises instructions that when read by a processor performs receiving (910), by at least one processor, at least one raw video stream that has at least one object, subtracting (912), by the at least one processor, at least one background of the at least one raw video stream, recording (914), by at least one memory, at least one subtracted background video stream, extracting (916), by the at least one processor, at least one object characteristic of the at least one object and at least one timestamp associated with the at least one object characteristic and recording (918), in the at least one memory the at least one object characteristic and the at least one timestamp associated with the at least one object characteristic.

The non-transitory computer readable storage medium may further comprise decoding, in the at least one memory the at least one raw video stream, subtracting, by the at least one processor, at least one background of the at least one raw video stream and recording, in the at least one memory, the at least one subtracted background video stream, and transmitting an area of the at least one object and indexing the at least one object characteristic and the at least one timestamp associated with the at least one object characteristic. The at least one object characteristic of the at least one object may comprise at least one of a movement, a facial recognition, a character recognition, a gesture recognition, a pedestrian detection, a vehicle recognition and a license plate recognition.

Those skilled in the art will understand that the format, layout, and content of the data structure as shown in the figures is illustrative rather than limiting of the instant disclosure. Specifically, those skilled in the art will recognize that various changes, modifications, additions, omissions, or alterations may be made to the data structure shown without departing from the scope of the instant disclosure as recited in the claims appended hereto. More particularly, other types of computing devices both mobile and those which provide a server function may be utilized.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example a network element, this may represent any of the above-described network components, etc.

Although an exemplary example of at least one of the system, method, and non-transitory computer readable medium of the present disclosure has been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture.

The above examples are for illustrative purposes and are not intended to limit the scope of the disclosure or the adaptation of the features described herein to particular components. Those skilled in the art will also appreciate that various adaptations and modifications of the above-described preferred examples can be configured without departing from the scope and spirit of the disclosure. Therefore, it is to be understood that, within the scope of the appended claims, the disclosure may be practiced by examples in addition to those specifically described.

What is claimed is:

1. A method of video data stream storage, comprising:
   receiving, by at least one processor, at least one raw video stream that has at least one object;
   recording, in at least one memory the at least one raw video stream;
   decoding the at least one raw video stream;
   detecting one or more objects in said raw video stream through an automatic in-sight processing without user input;
   subtracting, by the at least one processor, at least one background of the at least one raw video stream;
   extracting, by the at least one processor, at least one object characteristic of the at least one object and at least one timestamp associated with the at least one object characteristic, wherein the at least one object characteristic of the at least one object and the at least one timestamp are tagged with extended metadata;
   recording, in the at least one memory the at least one object characteristic the at least one timestamp associated with the at least one object characteristic and the extended metadata, the at least one subtracted background video stream and the decoded video stream;
   switching, by internal switch fabric and a load balance server the at least one area of the at least one object and at least one subtracted background video stream and
   transmitting, day the at least one processor, at least one area of the at least one object and the at least one subtracted background video stream, to a plurality of external video analytics servers, wherein the at least one area of the at least one object is further analyzed.

2. The method of claim 1 wherein the at least one object characteristic is at least one movement of the at least one object.

3. The method of claim 1 further comprising transmitting an area of the at least one object.

4. The method of claim 1 wherein the at least one object characteristic of the at least one object comprises at least one of a facial recognition, a character recognition, a gesture recognition, a pedestrian detection, a vehicle recognition and a license plate recognition.

5. The method of claim 1 further comprising indexing the at least one object characteristic and the at least one timestamp associated with the at least one object characteristic.

6. An apparatus for video data stream storage comprising at least one processor that:
   receives, by at least one processor, at least one raw video stream that has at least one object;
   records, by at least one memory, at least one raw video stream;
   decodes the at least one raw video stream;
   detects, by the at least one processor, one or more objects in said raw video stream through an automatic in-sight processing without user input;
   subtracts, by the at least one processor, at least one background of the at least one raw video stream;
   extracts, by the at least one processor, at least one object characteristic of the at least one object and at least one timestamp associated with the at least one object characteristic, wherein the at least one object characteristic of the at least one object and the at least one timestamp are tagged with extended metadata;
   records, in the at least one memory the at least one object characteristic the at least one timestamp associated with the at least one object characteristic and the extended metadata, the at least one subtracted background video stream and the decoded video stream;
   switches, by internal switch fabric and a load balance server the at least one area of the at least one object and at least one subtracted background video stream; and
   transmits, by the at least one processor, at least one area of the at least one object and the at least one subtracted background video stream, to a plurality of external video analytics servers, wherein the at least one area of the at least one object is further analyzed.

7. The apparatus of claim 6 wherein the at least one object characteristic is at least one movement of the at least one object.

8. The apparatus of claim 6 further comprising transmits an area of the at least one object.

9. The apparatus of claim 6 wherein the at least one object characteristic of the at least one object comprises at least one of a facial recognition, a character recognition, a gesture recognition, a pedestrian detection, a vehicle recognition and a license plate recognition.

10. The apparatus of claim 6 further comprising indexes the at least one object characteristic and the at least one timestamp associated with the at least one object characteristic.

11. A non-transitory computer readable storage medium to store instructions, that when executed cause at least one processor to perform:
- receiving, by at least one processor, at least one raw video stream that has at least one object;
- recording, by at least one memory, at least one raw video stream;
- decoding the at least one raw video stream;
- detecting one or more objects in said raw video stream through an automatic in-sight processing without user input;
- subtracting, by the at least one processor, at least one background of the at least one raw video stream;
- extracting, by the at least one processor, at least one object characteristic of the at least one object and at least one timestamp associated with the at least one object characteristic, wherein the at least one object characteristic of the at least one object and the at least one timestamp are tagged with extended metadata;
- recording, in the at least one memory the at least one object characteristic the at least one timestamp associated with the at least one object characteristic and the extended metadata, the at least one subtracted background video stream and the decoded video stream;
- switches, by internal switch fabric and a load balance server the at least one area of the at least one object and at least one subtracted background video stream; and
- transmitting, by the at least one processor, at least one area of the at least one object and the at least one subtracted background video stream, to a plurality of external video analytics servers, wherein the at least one area of the at least one object is further analyzed.

12. The non-transitory computer readable storage medium of claim 11, wherein the at least one object characteristic is at least one movement of the at least one object.

13. The non-transitory computer readable storage medium of claim 11 wherein the at least one object characteristic of the at least one object comprises at least one of a movement, a facial recognition, a character recognition, a gesture recognition, a pedestrian detection, a vehicle recognition and a license plate recognition.

14. The non-transitory computer readable storage medium of claim 11, further comprising indexing the at least one object characteristic and the at least one timestamp associated with the at least one object characteristic.

* * * * *